United States Patent
Sarangapani et al.

(10) Patent No.: US 8,143,996 B2
(45) Date of Patent: Mar. 27, 2012

(54) DECENTRALIZED RADIO FREQUENCY IDENTIFICATION SYSTEM

(75) Inventors: Jagannathan Sarangapani, Rolla, MO (US); Anil Ramachandran, Rolla, MO (US); Can Saygin, San Antonio, TX (US); Kainan Cha, Rolla, MO (US)

(73) Assignee: The Curators of the University of Missouri, Rolla, MO (US)

( * ) Notice: Subject to any disclaimer, the term of this patent is extended or adjusted under 35 U.S.C. 154(b) by 1113 days.

(21) Appl. No.: 11/970,912

(22) Filed: Jan. 8, 2008

(65) Prior Publication Data

US 2008/0174410 A1      Jul. 24, 2008

Related U.S. Application Data

(60) Provisional application No. 60/883,891, filed on Jan. 8, 2007.

(51) Int. Cl.
*H04Q 5/22*  (2006.01)
*G08B 13/14*  (2006.01)
*G08B 26/00*  (2006.01)
*H04B 7/00*  (2006.01)
*H04W 4/00*  (2009.01)

(52) U.S. Cl. .............. 340/10.2; 340/572.1; 340/505; 455/41.2; 455/466

(58) Field of Classification Search .................. None
See application file for complete search history.

(56) References Cited

U.S. PATENT DOCUMENTS

| | | | |
|---|---|---|---|
| 5,525,992 A | 6/1996 | Froschermeier | |
| 6,148,291 A | 11/2000 | Radican | |
| 6,483,427 B1 | 11/2002 | Werb | |
| 6,600,418 B2 | 7/2003 | Francis et al. | |
| 6,639,509 B1 | 10/2003 | Martinez | |
| 7,502,340 B1 * | 3/2009 | Chuang et al. | 370/318 |
| 2002/0058477 A1 * | 5/2002 | Chapelle | 455/13.4 |
| 2003/0174099 A1 | 9/2003 | Bauer et al. | |
| 2004/0192247 A1 | 9/2004 | Rotta et al. | |
| 2005/0080680 A1 | 4/2005 | Elam et al. | |

(Continued)

FOREIGN PATENT DOCUMENTS

WO        01/65481 A1       9/2001

(Continued)

OTHER PUBLICATIONS

Dobkin, et al., "A Radio-Oriented Introduction to RFID—Protocols, Tags and Applications," High Frequency Electronics, RFID Tutorial, Aug. 2005, pp. 32-46.

(Continued)

*Primary Examiner* — Daniel Wu
*Assistant Examiner* — Fekadeselassie Girma
(74) *Attorney, Agent, or Firm* — Polsinelli Shughart PC; Robert O. Enyard, Jr.

(57) ABSTRACT

A decentralized RFID system and method provides a decentralized power control scheme for adaptively adjusting the power of a RFID reader in a network of readers communicating with an RFID tag. The transmission power of each reader in a dense network environment is controlled as a function of interference sensed from other readers in the network and a current SNR (SNR) of a backscatter signal received from the tag. If the current SNR is above a required SNR, transmission power of the reader is reduced, which results in lower interference for other RFID readers. Similarly, if the expected SNR is below the required threshold, power is increased sufficiently to ensure that the target or required SNR is achieved.

12 Claims, 11 Drawing Sheets

U.S. PATENT DOCUMENTS

| | | |
|---|---|---|
| 2005/0083181 A1 | 4/2005 | Jalkanen et al. |
| 2005/0084003 A1 | 4/2005 | Duron et al. |
| 2005/0093679 A1 | 5/2005 | Zai et al. |
| 2005/0280508 A1 | 12/2005 | Mravca et al. |
| 2006/0006986 A1 | 1/2006 | Gravelle et al. |
| 2006/0012465 A1 | 1/2006 | Lee et al. |
| 2006/0022800 A1 | 2/2006 | Krishna et al. |
| 2006/0022815 A1* | 2/2006 | Fischer et al. ............ 340/505 |
| 2006/0049249 A1 | 3/2006 | Sullivan |
| 2006/0049946 A1 | 3/2006 | Sullivan et al. |
| 2006/0054708 A1 | 3/2006 | Koo et al. |
| 2006/0103535 A1 | 5/2006 | Pahlaven et al. |
| 2006/0124738 A1* | 6/2006 | Wang et al. ............ 235/385 |
| 2006/0176152 A1* | 8/2006 | Wagner et al. ............ 340/10.2 |
| 2006/0186999 A1 | 8/2006 | McLaughlin |
| 2006/0197652 A1 | 9/2006 | Hild et al. |
| 2006/0197653 A1 | 9/2006 | Kung et al. |
| 2006/0202800 A1 | 9/2006 | Ohashi et al. |

FOREIGN PATENT DOCUMENTS

| | | |
|---|---|---|
| WO | 2005/085899 A1 | 9/2005 |

OTHER PUBLICATIONS

Dobkin, et al., "The RF in RFID: A Radio-oriented Introduction to Radio Frequency Identification," Enigmatics, Jun. 7, 2005, Part II, v. 0.1, pp. 1-20.

IBM Corporation, "Using RFID technology to enhance output solutions," IMB Printing Systems, Mar. 2006, pp. 1-14 (16 pages).

Unknown, "Medium Access Mechanism to Prevent RFID Reader Collision," Inside Edge, submitted Sep. 10, 2005, pp. 1-21.

Intelleflex Corporation, Passive, Battery-assisted Passive and Active Tags: A Technical Comparison, 2005, pp. 1-6.

Office Action dated May 28, 2009 for U.S. Appl. No. 12/037,799 (15 pages).

* cited by examiner

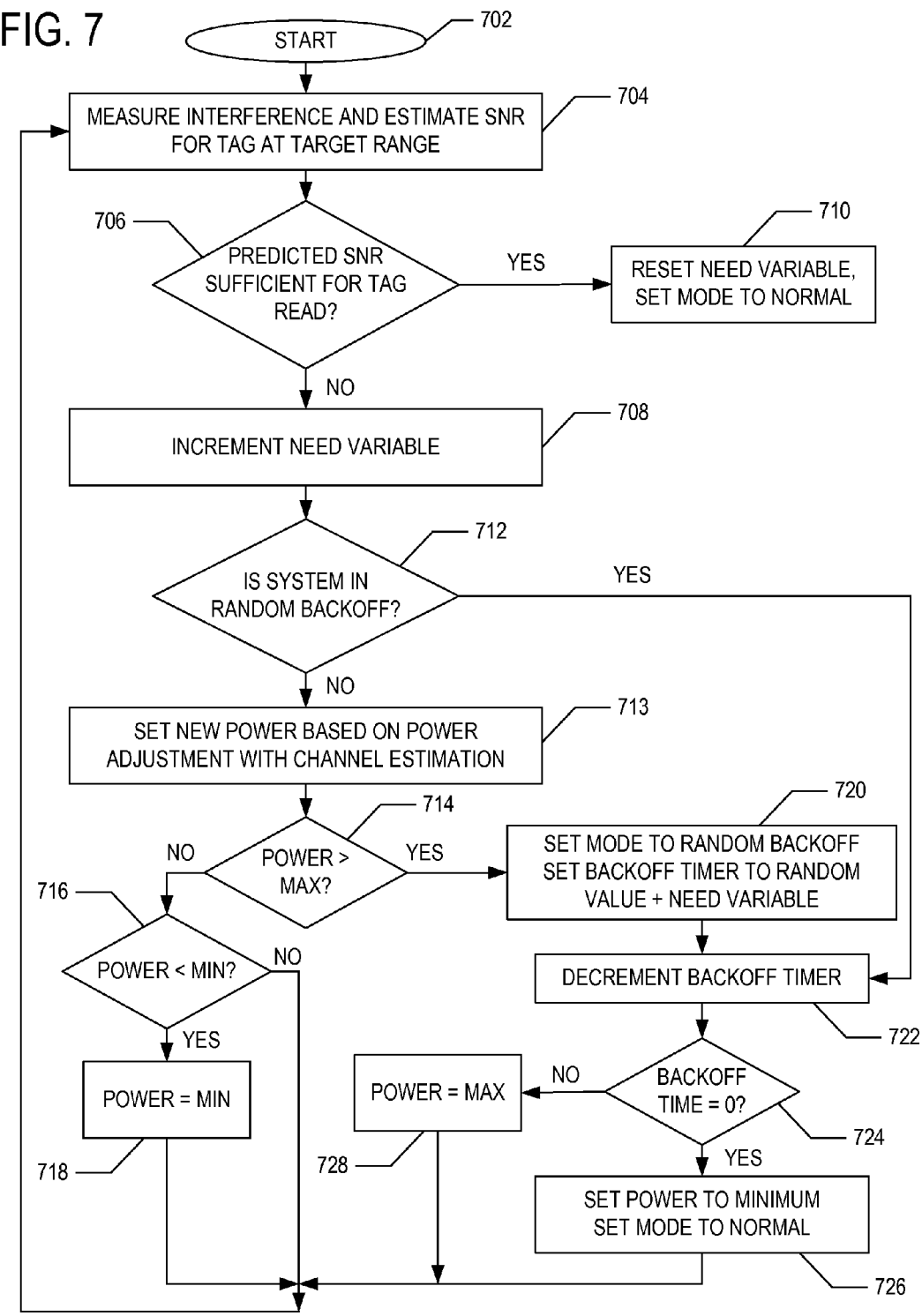

800

DECENTRALIZED RADIO FREQUENCY IDENTIFICATION SYSTEM

CROSS-REFERENCE TO RELATED APPLICATION

This patent application claims priority from U.S. provisional patent application Ser. No. 60/883,891 filed on Jan. 8, 2007 and is herein incorporated by reference in its entirety.

STATEMENT REGARDING FEDERALLY SPONSORED RESEARCH

This invention was made with Government support under Grant No. FA8650-04-C-704 awarded by the Air Force Research Laboratory. The Government has certain rights in the invention.

FIELD

The present document relates to a radio frequency identification system, and more particularly to a decentralized radio frequency identification system.

BACKGROUND

Radio frequency identification (RFID) technology has experienced increased application in the manufacturing process and industry in recent years. From supply chain logistics to enhanced shop floor control, this technology presents opportunities for process improvement or re-engineering. The underlying principle of RFID technology is to obtain information from an RFID tag ("tag") by using a RFID reader ("reader") through radio frequency (RF) communication. The tag can be incorporated into or attached to a product, material, equipment, or person. In passive RFID systems, the tag does not include an internal power source and is activated by harvesting energy from a carrier signal received from the reader. Once activated, the tag responds to the reader through backscatter communication. This backscatter communication may include information that identifies the passive tag, and/or information about the item associated with the tag.

A network of distributed readers can be used to monitor the flow of tags and provide visibility in a manufacturing environment. For example, each RFID reader may be operatively associated with a central computer that determines the location of the tagged product or material based on the particular RFID reader that detected the passive tag's backscatter energy. Because readers have a maximum distance, or read range, at which they can communicate with a tag, it may be necessary to form a dense reader network by arranging readers relatively close to one another to obtain a desired coverage area within a particular process flow.

Readers can communicate with the tags using radio frequencies within approved bands such as a 431 MHZ to 478 MHZ band or an 862 MHZ to 956 MHz band. The selected band is divided into a plurality of channels of specified bandwidth (e.g., 200 kHz), and each reader can occupy a given channel or predetermined time period. When multiple readers are deployed in such a working environment, a carrier signal from one reader may reach another reader in the same channel at a certain distance and interfere with that reader's ability to read any tags within a certain range. This RFID interference problem is referred to as Reader Collision, and has been classified as frequency and tag interference. Frequency interference occurs when readers operating in the same frequency channel introduce high noise levels at each other, thereby interfering or jamming the on-going communication with tags. Tag interference occurs when multiple readers are attempting to read a tag at the same time regardless of the differences in frequency. Consequently, Reader Collision causes tags to be unreadable and disturbs the normal operation of the readers by lowering the overall read rates.

SUMMARY

In one embodiment, a decentralized RFID system may include a first reader for transmitting a first carrier signal, a second reader for transmitting a second carrier signal; a tag for receiving the first and second carrier signals wherein the tag is responsive to the first carrier signal to transmit a first backscatter signal, and wherein the tag is responsive to the second carrier signal to transmit a second backscatter signal. The first and second readers further include a first processor and a second processor, respectively, and wherein the first processor measures a degree of interference from the second carrier signal, and wherein the second processor measures a degree of interference from the first carrier signal. The first and second processors each executing instructions for adjusting a respective transmission power level of the first and second carrier signals being transmitted from the first and second readers, respectively, as a function of the measured degree of interference.

In another embodiment, a decentralized RFID system may include a plurality of readers, each of the plurality of readers capable of transmitting a respective carrier signal; at least one tag in operative communication with one or more of the plurality of readers for receiving one or more of the respective carrier signals from the plurality of readers; and wherein each of the plurality of readers includes a module having an algorithm for adjusting a respective power output for each of the plurality of readers as a function of a respective measured interference at that respective plurality of readers in order to achieve a predetermined signal-to-noise ratio.

In yet another embodiment, a method for adjusting a transmission power level of at least one of a plurality of radio frequency identification (RFID) readers included in a network of RFID readers may include: transmitting a first carrier signal from a first RFID reader included in the network of RFID readers and transmitting a second carrier signal from a second RFID reader of the network included in RFID readers, wherein the first RFID reader operates at a first power level, and wherein the second RFID reader operates at a second power level; receiving the first and second carrier signals at a RFID tag; generating, at the RFID tag, a first backscatter signal in response to the first carrier signal and a second backscatter in response to the second carrier signal; processing the second carrier signal at the first RFID reader to measure a first level of interference and processing the first carrier signal at the second RFID reader to measure a second interference level, the first level of interference corresponding to an amount of interference from the second carrier signal, and the second level of interference corresponding to an amount of interference from the first carrier signal; and adjusting the first power level of the first RFID reader as a function of the first level of inference and adjusting the second power level of the second RFID reader as a function of the second level of interference.

In a further embodiment, a processor having executable components for adjusting a transmission power level of at least one radio frequency identification (RFID) reader in a decentralized RFID system with the decentralized RFID system may include a first reader to transmit a first carrier signal at a first power level; a second reader to transmit a second carrier signal at a second power level, and a tag to receive the first and second carrier signals and to generate, at the tag, a first backscatter signal in response to the first carrier signal and a second backscatter in response to the second carrier signal. The processor may include a power update component to determine a current transmission power corresponding to the first carrel signal and to calculate a current signal-to-noise ratio value based on the current transmission power level and signal-to-noise ratio data retrieved from a memory. The processor may further include a signal-to-noise ratio comparator component to compare the current signal-to-noise value to a required signal-to-noise value retrieved from the memory and to generate a first output signal as a function of the comparison. In addition, the processor may include a percentage signal-to-noise ratio achieved component to calculate a back-off parameter as a function of the first output signal, wherein the back-off parameter corresponds to a percentage of time the required signal-to-noise ratio is achieved, wherein the power update component is further responsive to the first generated output signal to calculate a new transmission power required to achieve the desired signal-to-noise ratio. The processor may also include a limiter component to receive the new transmission power and to limit the new calculated transmission power within a specified transmission power range and a power comparator component to receive the new transmission power thru the limiter component, to compare the new transmission power to a maximum transmission power value retrieved from the memory, and to generate a second output signal as a function of the comparison. Finally, the processor may include a selective back-off component is responsive to the second output signal from the power comparator component, the new transmission power received thru the limiter, and the back-off parameter from the percentage signal-to-noise ratio achieved component to determine whether to operate the first reader in a normal mode or a selective back-off mode, wherein the first reader outputs the new transmission power for generating the first carrier signal during normal mode, and wherein the first reader waits for a determined time period before outputting the new transmission power during the back-off mode.

Additional objectives, advantages and novel features will be set forth in the description which follows or will become apparent to those skilled in the art upon examination of the drawings and detailed description that follows.

BRIEF DESCRIPTION OF THE DRAWINGS

FIG. 7 is a flow chart illustrating a method for implementing a distributed adaptive power control (DAPC) of the decentralized RFID tracking system;

Corresponding reference characters indicate corresponding elements among the several views. The headings used in the figures should not be interpreted to limit the scope of the figures.

DETAILED DESCRIPTION

Figure 1:
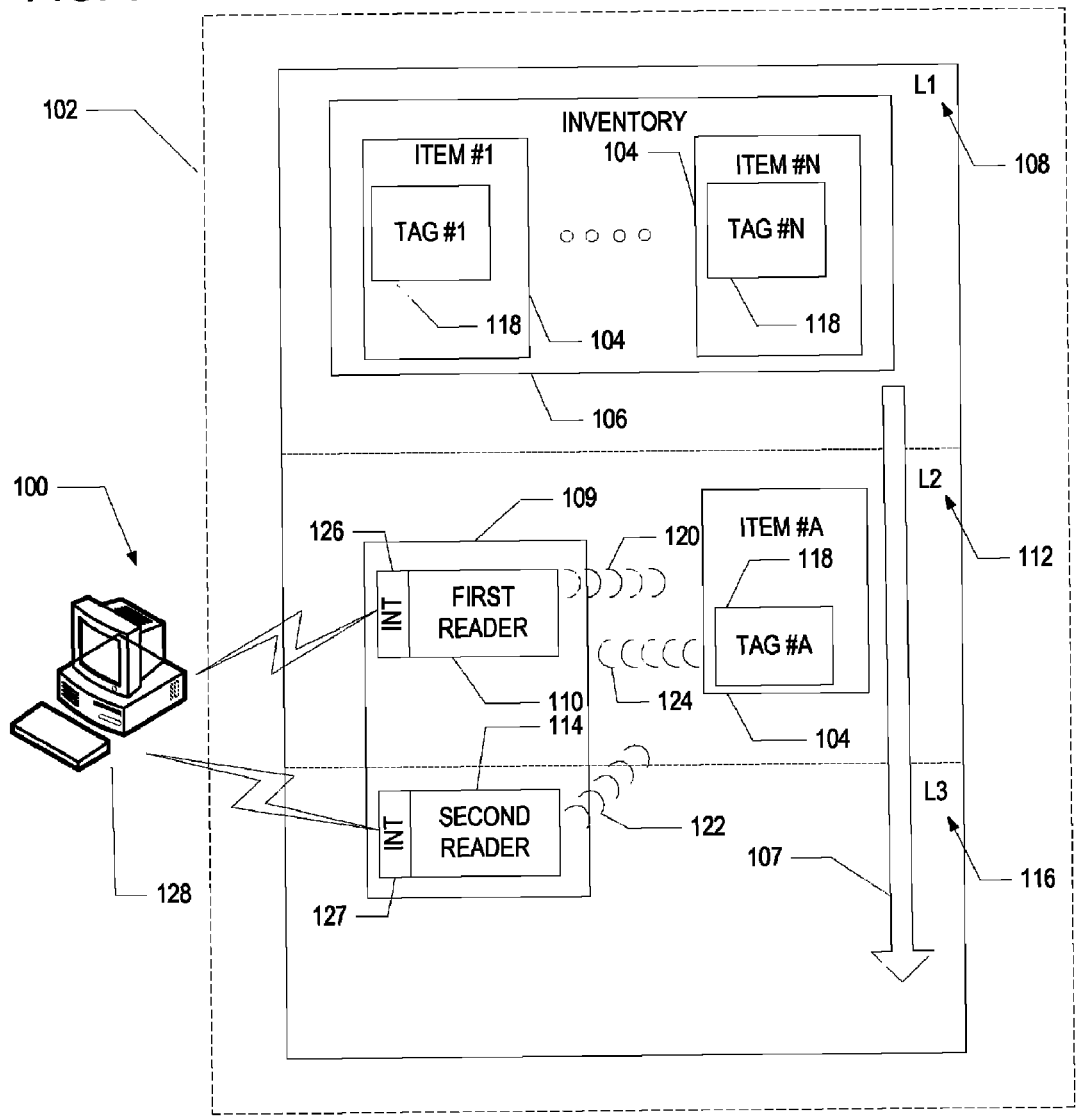
FIG. 1 is a block diagram illustrating a material flow process in which embodiments of the RFID system may be implemented.

Referring to the drawings, a system and method for implementing a decentralized RFID system is generally indicated as 100 in FIG. 1. As shown in FIG. 1, a block diagram illustrates a material flow process 102 in which aspects of the decentralized RFID system 100 may be implemented. The decentralized RFID system 100 may be used to track the location of one or more items 104 of inventory 106 during movement through a material flow path, as indicated by reference character 107. The material flow path 107 may be associated with a manufacturing process or an inventory logistics system. The inventory 106 may include one or more items (e.g., items 1–N) that are being stored in an inventory staging area or a first location, L1, in the material flow process 102, as indicated by reference character 108.

A network of RFID readers 109 are strategically positioned at different locations along the material flow path 107 to track the location of items 104 traveling along the material flow path 107. For example, a first reader 110 is located at a second location, L2, along the material flow path 107, as indicated by reference character 112, and a second reader 114 is located at a third location, L3, along the material flow path 107, as indicated by reference character 116.

A RFID tag 118 can be physically affixed to or incorporated into each of the one or more items 104 of inventory 106. For example the tag 118 may be affixed to items in retail inventory, warehouse inventory, manufacturing inventory, or any other type of inventory. The first and second readers 110, 114 may transmit first and second carrier signals 120, 122, respectively, which can be received by the tag 118 of an item 104 located within the transmission range of one or both of the first and second readers 110, 114.

The tag 118 is essentially a data-carrying device that does not include an internal voltage source, and is totally passive when it is not within the transmission range of a reader. In other words, the tag 118 is only activated when it is within the transmission or read range of the first reader 110 or the second reader 114. The power required to activate the tag 118 is harvested from a received carrier signal. For example, the first and second carrier signals 120, 122 may be low-voltage oscillating RF energy signals that have an initial power level $P_1$. The tag 118 includes an energy harvesting circuit (not shown) that uses the low-voltage oscillating RF energy carrier signal to generate a voltage to power internal communication circuitry of the tag 118. When the tag 118 is within the transmission range of the first reader 110 such that tag 118 receives the carrier signal 120, the tag 118 then transmits data via a backscatter signal 124 having a power level $P_2$, back to the first reader 110. Alternatively, when the tag 118 is within the transmission range of the second reader 114 such that it receives the carrier signal 122, the tag 118 transmits data via the backscatter signal 124 having a power level $P_2$, back to the second reader 114. The transmitted data may identify the tag 118, and/or information about the item 104 associated with the tag 118. The first and second readers 110, 114 can each be configured with communication interfaces 126, 127, respectively, that enable wired or wireless communication with a host computer 128. As a result, the host computer 128 can communicate with each of the first and second readers 110, 114 for the purpose of tracking items 104 as those items 104 travel along the material flow process 107.

Due to attenuation and scattering, the power level of the backscatter signal 124 is less than the power level of the originating carrier signals 120,122. Hence, the read range between a particular reader in the network of readers 109 and the tag 118 is dependant on the transmission power of that particular reader. Thus, in order to achieve a desired coverage area, it may be necessary to place readers relatively close to one another. As described above, when multiple readers are deployed in a working environment such as illustrated in FIG. 1, the carrier signal 122 from the second reader 114 may reach the first reader 110 and jam or interfere with ongoing communication between the first reader 110 and tag 118. Alternatively, the carrier signal 120 from the first reader 110 may reach the second reader 114 and jam or interfere with ongoing communication between the second reader 114 and tag 118. This occurs because the tag 118, first reader 110, and second reader 114 transmit in the same frequency band, and is referred to as frequency interference. For purposes of illustration, the carrier signal 122 from the second reader 114 is described herein as interfering with ongoing communication between the first reader 110 and the tag 118. In other words, the backscatter signal 124 is described herein as being generated by the tag 118 in response to the first carrier signal 120 from the first reader 110.

Figure 2:
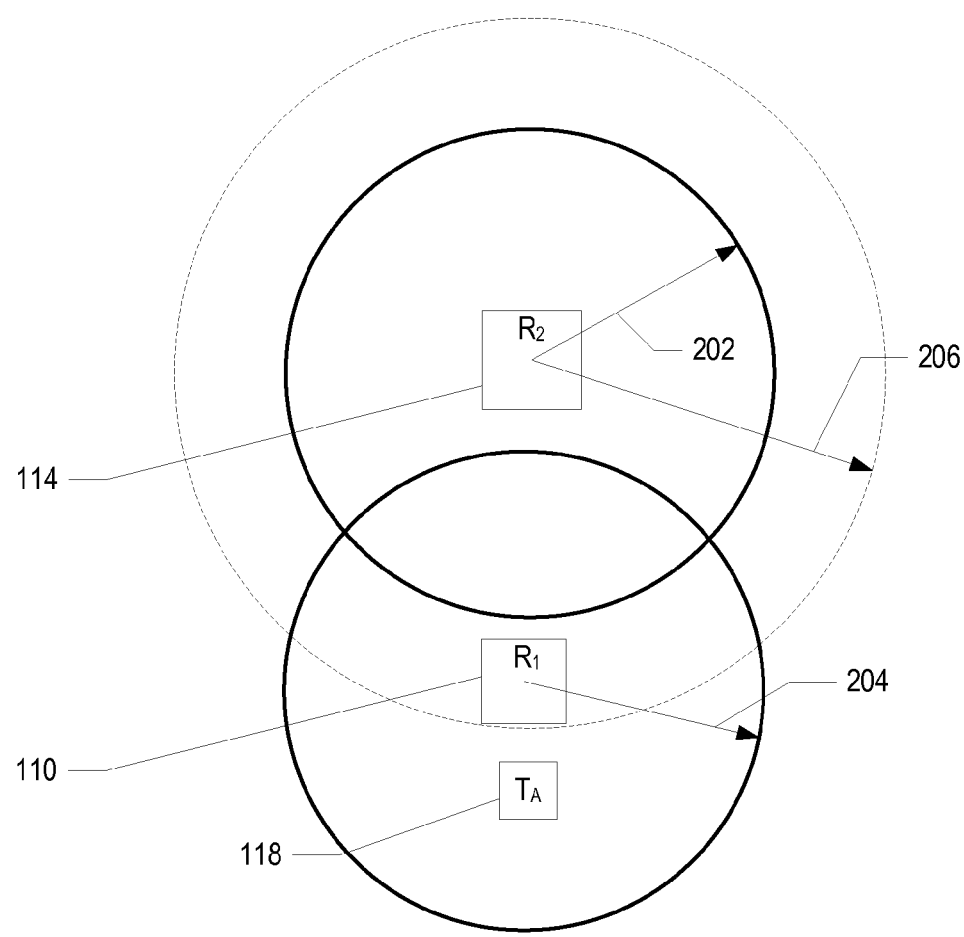
FIG. 2 is a simplified illustration showing frequency interference occurring between a first reader and a second reader.

FIG. 2 illustrates frequency interference occurring between the first reader 110 and the second reader 114. The first reader 110 has a first read range, as indicate by reference character 202, while the second reader 114 has a second read range and a frequency interference range, as indicated by reference characters 204, 206, respectively. In this example, it can be seen that the first reader 110 is within the frequency interference range 206 of the second reader 114. As a result, the second carrier signal 122 transmitted from the second reader 114 can swamp out the backscatter signal 124 transmitted from the tag 118 to the first reader 110. In order to receive the data included in the backscatter signal 124 transmitted back by the tag 118, the Signal-to-Noise Ratio (SNR) of the backscatter signal 124 received at the first reader 110 should be greater than an interference threshold.

Referring back to FIG. 1, the decentralized RFID system 100 provides a decentralized power control scheme for adaptively adjusting the power of a reader in a network of readers 109 based on a sensed level of frequency interference at that particular reader. In one embodiment, the decentralized RFID system 100 may utilize an adaptive power control scheme that controls the transmission power level of the carrier signal 120 such that the expected SNR reaches the SNR required for a desired reading range. Thus, if the expected SNR is above a required SNR, transmission power is reduced, which results in lower interference for other RFID readers in the reader network 109. Similarly, if the expected SNR is below the required threshold, power is increased sufficiently to ensure that the required SNR is achieved. In another embodiment, the decentralized RFID system 100 may provide for a probabilistic power control by adjusting the transmission power based on certain probability distributions. This type of probabilistic power control may be in addition, or an alternative to the power control scheme. As a result, the decentralized RFID system 100 may eliminate or minimize frequency interference issues within a network of readers 109 while maintaining a desired read range and desired read rates for each of the first and second readers 110, 114.

Figure 3A:
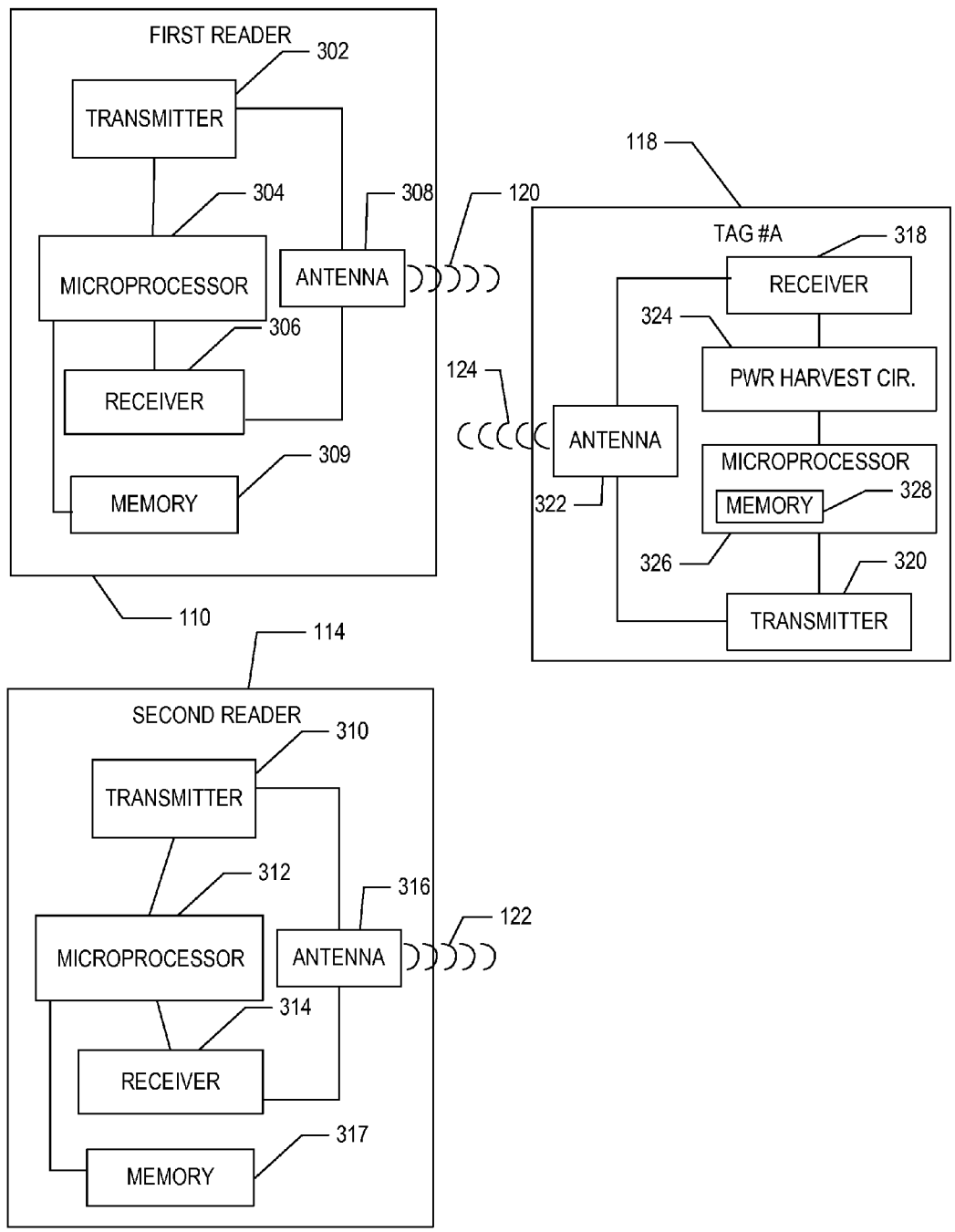
FIG. 3A is a block diagram illustrating operational components of one aspect of the decentralized RFID system.

Referring to FIG. 3A, a block diagram illustrates operational components of the first reader 110, the second reader 114, and the tag 118 that can be used to implement the decentralized RFID system 100. Before describing the components in detail, it is helpful to describe some of the principles utilized in implementing the decentralized RFID system 100.

In a backscatter communication system, the SNR must meet a required threshold $R_{required}$, which can be expressed as $$R_{required} = (E_b/N_0)/(W/D) \qquad (1)$$

where $E_b$ is the energy per bit of the received signal in watts, $N_0$ is the noise power in watts per Hertz, D is the bit rate in bits per second, and W is the radio channel bandwidth in Hertz. For a known modulation method and BER (bit-error-rate), $E_b/N_0$ can be calculated. Hence, $R_{required}$ can be selected based on desired read rate and BER.

For any reader i, the following must hold for successful tag detection $$\frac{P_{bs}}{I_i} = R_i \geq R_{required} \qquad (2)$$

where $P_{bs}$ is the backscatter power from a tag, $I_i$ is the interference at the tag backscatter frequency, and $R_i$ is the SNR at a given reader.

In general, $P_{bs}$ can be evaluated in terms of the reader transmission power $P_i$ and tag distance $r_{i-t}$. Other variables such as reader and tag antenna gains, modulation indexing and wavelength, can be considered as constants and simplified in (3) as $K_1$. Then, $$P_{bs} = K_1 \cdot \frac{P_i}{r_{i-t}^{4q}} = g_{ii} \cdot P_i \qquad (3)$$

here q is environment dependent variable considering path loss, and $g_{ii}$ represents the channel loss from reader i to tag and back. Communication channel between the reader and interrogated tag should be in a relatively short range, for this reason Rayleigh fading and Shadowing effects are not considered for the reader-tag link. Influence by reflection can also be considered as a constant merging into $g_{ii}$ assuming the environment is relatively stable. Hence, $P_{bs}$ can be evaluated using path loss alone and by ignoring other channel uncertainties.

Interference caused by reader j at reader i is given as $$I_{ij} = K_2 \cdot \frac{P_j}{r_{ij}^{2q}} \cdot 10^{0.1\zeta} \cdot X_{ij}^2 = g_{ij} \cdot P_j \qquad (4)$$

where $P_j$ is the transmission power of reader j, $r_{ij}$ is the distance between the two readers, $K_2$ represents all other constant properties, $10^{0.1\zeta}$ corresponds to the effect of shadowing and X is a random variable with Rayleigh distribution to account for Rayleigh fading loss in the channel between reader j and reader i. After simplification, $g_{ij}$ represents the channel loss from reader j to reader i. Note that since the interference actually occurs at the tag backscatter sideband, only power at that particular frequency needs to be considered. This factor is also accounted for in $K_2$ and $g_{ij}$.

Cumulative interference $I_i$ at any given reader i is essentially the sum of interference introduced by all other readers plus the variance of the noise $\eta$.

$$I_i = \sum_{j \neq i} g_{ij} P_j + \eta \quad (5)$$

Given the transmission power and interference, the actual detection range of a reader is given by $$r_{actual}^{4q} = \frac{K_1 \cdot P_i}{R_{required} \cdot I_i} \quad (6)$$

Received SNR for a tag at a desired range $r_d$ can be calculated as $$R_{rd} = \frac{K_1 \cdot P_i}{r_d^{4q} \cdot I_i} \quad (7)$$

Merging (6) and (7), the actual detection range $r_{actual}$ can be calculated in terms of $R_{rd}$ as $$r_{actual} = r_d \left( \frac{R_{rd}}{R_{required}} \right)^{1/4q} \quad (8)$$

For analysis purposes, assume that the reader due to the BER specifications successfully detects any tag within such a range. If a reader is completely isolated, (i.e., no interference), a maximum range $r_{max}$ can be achieved using the maximum power $P_{max}$ of a given reader. In a practical application, it is not possible to expect this maximum range because interference is likely to exist.

By substituting equations (3) and (4) into equation (2), note that the SNR for a particular reader can be represented as a time-varying function and given by.

$$R_i(t) = \frac{P_{bs}(t)}{I_i(t)} \quad (9)$$
$$= g_{ii} \cdot P_i(t) \bigg/ \left( \sum_{j \neq i} g_{ij}(t) P_j(t) + u_i(t) \right)$$

Notice that $g_{ii}$ is constant for a particular reader-tag link by assuming that the tag is stationary. If the desired range for the reader is defined as $r_d$ which is less than $r_{max}$, then define the SNR for the backscatter signal from a tag placed at a distance $r_d$ to a reader as $$R_{i-rd}(t) = \frac{P_{bs-rd}(t)}{I_i(t)} \quad (10)$$
$$= g_{ii-rd} \cdot P_i(t) \bigg/ \left( \sum_{j \neq i} g_{ij}(t) P_j(t) + u_i(t) \right)$$

where $$g_{ii-rd} = \frac{K_1}{r_d^{4q}} \quad (11)$$

Equation (10) provides the basic relationship between the SNR and the output power of all readers through interference experienced at a particular in the network. This relationship can be used to derive the power control algorithms.

Figure 3B:
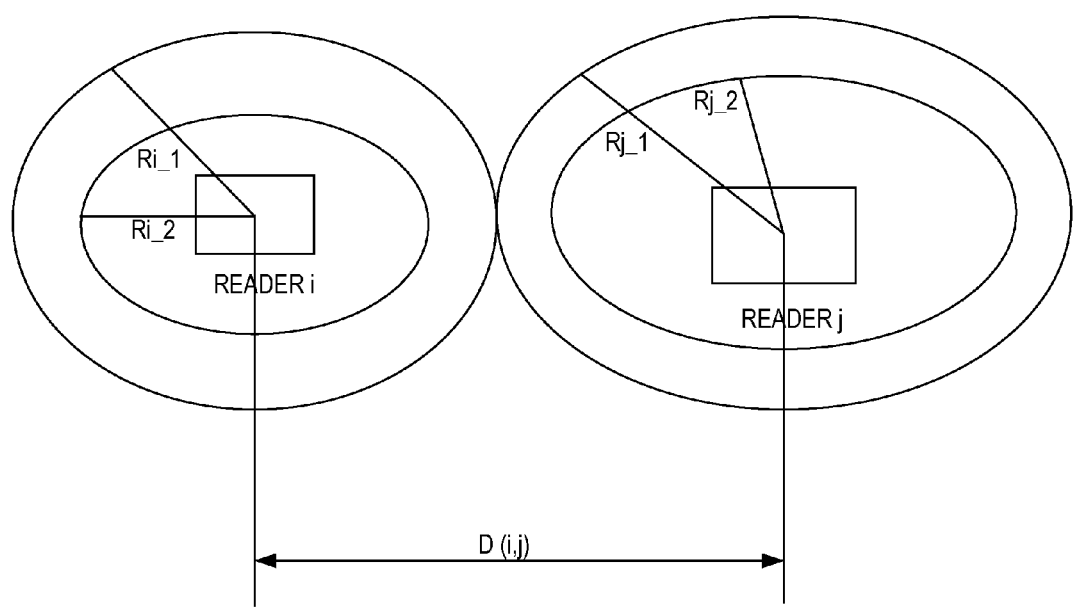
FIG. 3B is a simplified illustration showing read ranges of readers in a two-reader network.

To better understand the problem, consider a two-reader model. Two readers i and j spaced D(i, j) apart, each with the desired range $R_{i\_1}$ and $R_{j\_1}$, respectively are shown in FIG. 3B. Readers must provide transmission powers $P_i$ and $P_j$ to achieve their respective desired range without considering interference. However, due to the interference introduced by each other, the actual detection range in fact decreases to $R_{i\_2}$ and $R_{j\_2}$, respectively.

As a result of not achieving the SNR at a desired detection range due to interference, readers must attempt to increase their transmission power. If both readers increase their powers greedily, they will eventually reach the maximum power without achieving the desired range due to increased interferences. Further, the SNR target is not met and as a result the tags are not read even those that are in range. One strategy for solving this problem is to operate each of the readers in mutually exclusive timeslots. However, as the number of readers increase, this strategy severely degrades each reader's average read time and detection range and eventually increases reading intervals.

A more appropriate solution is to balance the transmission power between the two readers in order to reach the equilibrium where multiple readers can achieve their respective read range. In the above model, if reader i transmits at $P_{max}$ and reader j is off, a read range greater than the targeted value of $R_{i\_1}$ can be achieved. On the other hand, there exists a power level at which reader j can transmit and still allow i to achieve read range $R_{i\_1}$. This process can be applied in reverse to enable reader j to achieve its targeted range. Under such circumstances, the average read range of both readers is improved over the typical on and off cycle. Such a yielding strategy is required in dense reader networks where all the readers may not achieve the desired range simultaneously. The effect of this improvement will be significant in dense networks due to the strategy.

The decentralized RFID system 100 can be implemented using adaptive power control (DAPC) technique or a probabilistic power control (PPC) technique. DAPC involves systematic power updates based on local interference measurements at each reader, and uses embedded channel prediction to account for the time-varying fading channel state for the next cycle. For dense reader networks, where all readers cannot reach the target SNR simultaneously, a selective backoff technique can be used to ensure that all readers in the reader network 109 achieve their desired range.

By contrast, according to the PPC technique, each reader in the reader network selects output power from a specified probability distribution. Statistical distribution for the desired read range can be specified as the target. To achieve the target, the output power distribution on each reader is altered based on interference measurements.

As discussed above, implementing frequency hopping spread spectrum (FHSS) on readers has been explored in the past as a solution to the interference problem. While FHSS reduces the probability of interference, it is not a universal solution because of the differing spectral regulations over the world. The present decentralized RFID system 100 is not dependent upon any existing RFID standards or implementations and can be adapted to improve the performances of RFID reader networks.

One aspect of the DAPC technique consists of two building blocks: adaptive power update and selective back-off. The goal of the adaptive power update is to achieve a required SNR with an appropriate output power by correctly estimating the interference and any channel uncertainties. In dense networks, selective back-off forces high power readers to yield so that other readers can achieve required SNR.

The development and the performance of DAPC is demonstrated analytically. Differentiating the SNR (10) since the channel interference follows the time-varying nature of the channel, yields $$R'_{i-rd}(t) = g_{ii-rd} \cdot \frac{P'_i(t)I_i(t) - P_i(t)I'_i(t)}{I_i^2(t)} \tag{12}$$

where $R_{i-rd}'(t)$, $P_i'(t)$ and $I_i'(t)$ are the derivatives of $R_{i-rd}(t)$, $P_i(t)$, and $I_i(t)$, respectively.

Applying Euler's formula, $x'(t)$ can be expressed as $$\frac{x(l+1) - x(l)}{T}$$

in discrete time domain, where T is the sampling interval. Equation (12) can be transformed into discrete time domain as $$\frac{R_{i-rd}(l+1) - R_{i-rd}(l)}{T} = \tag{13}$$
$$\frac{g_{ii-rd} \cdot P_i(l+1)}{I_i(l)T} - \frac{g_{ii-rd} \cdot P_i(l)}{I_i^2(l)T} \cdot \sum_{j \neq i} \binom{[g_{ij}(l+1) - g_{ij}(l)]P_j(l) +}{g_{ij}(l)[P_j(l+1) - P_j(l)]}$$

After the transformation, equation (13) can be expressed as $$R_{i-rd}(l+1) = \alpha_i(l)R_{i-rd}(l) + \beta_i v_i(l) \tag{14}$$

where $$\alpha_i(l) = 1 - \frac{\sum_{j \neq i} \Delta g_{ij}(l)P_j(l) + \Delta P_j(l)g_{ij}(l)}{I_i(l)} \tag{15}$$

$$\beta_i = g_{ii-rd} \tag{16}$$

and $$v_i(l) = P_i(l+1)/I_i(l) \tag{17}$$

with the inclusion of noise, equation (14) is written as $$R_{i-rd}(l+1) = \alpha_i(l)R_{i-rd}(l) + \beta_i v_i(l) + r_i(l)\omega_i(l) \tag{18}$$

where $\omega(l)$ is the zero mean stationary stochastic channel noise with $r_i(l)$ as its coefficient.

From equation (18) the SNR can be obtained at time instant l+1 as a function of channel variation from time instant I to I+1. The difficulty in designing the DAPC is that channel variation is not known before hand. Therefore a must be estimated for calculating the feedback control. Defining $y_i(k) = R_{i-rd}(k)$, then equation (18) can be expressed as $$y_i(l+1) = \alpha_i(l)y_i(l) + \beta_i v_i(l) + r_i(l)\omega_i(l) \tag{19}$$

Since $\alpha_i$, $r_i$ are unknown, equation (19) can be transformed into $$y_i(l+1) = [\alpha_i(l) \quad r_i(l)] \begin{bmatrix} y_i(l) \\ \omega_i(l) \end{bmatrix} + \beta_i v_i(l) \tag{20}$$
$$= \theta_i^T(l)\psi_i(l) + \beta_i v_i(l)$$

where $\theta_i^T(l) = [\alpha_i(l) \ r_i(l)]$ is a vector of unknown parameters, and $$\psi_i(l) = \begin{bmatrix} y_i(l) \\ \omega_i(l) \end{bmatrix}$$

is the regression vector. Selecting feedback control for DAPC as $$v_i(l) = \beta_i^{-1}[-\hat{\theta}_i(l)\Psi_i(l) + \gamma + k_v e_i(l)] \tag{21}$$

where $\hat{\theta}_i(l)$ is the estimate of $\theta_i(l)$, then the SNR error system is expressed as $$e_i(l+1) = k_v e_i(l) + \theta_i^T(l)\psi_i(l) - \hat{\theta}_i^T(l) = k_v e_i(l) + \tilde{\theta}_i^T(l)\psi_i(l) \tag{22}$$

where $\tilde{\theta}_i(l) = \theta_i(l) - \hat{\theta}_i(l)$ is the error in estimation.

From equation (22), it is clear that the closed-loop SNR error system is driven by channel estimation error. If the channel uncertainties are properly estimated, then SNR estimation error tends to be zero, therefore the actual SNR approaches the target value. In the presence of error in estimation, only boundedness of error in SNR can be shown. Given the closed-loop feedback control and error system, channel estimation algorithms can be developed.

Consider now the closed-loop SNR error system with channel estimation error, $\epsilon(l)$, as $$e_i(l+1) = k_v e_i(l) + \tilde{\theta}_i^T(l)\psi_i(l) + \epsilon(l) \tag{23}$$

where $\epsilon(l)$ is the error in estimation which is considered bounded above $\|\epsilon(l)\| \leq \epsilon_N$, with $\epsilon_N$ a known constant.

Given the DPC scheme above with channel uncertainties, if the feedback from the DPC scheme is selected (i.e. When the tag 118 is within the transmissions range of the first reader 110 such that tag 118 receives the carrier signal 120, the tag 118 then transmits data via a backscatter signal 124 having a power level P2, back to the first reader 110.), then the mean channel estimation error along with the mean SNR error converges to zero asymptotically, if the parameter updates are taken as $$\hat{\theta}_i(l+1) = \hat{\theta}_i(l) + \sigma\psi_i(l)e_i^T(l+1) - \Gamma\|I - \psi_i^T(l)\psi_i(l)\|\hat{\theta}_i(l) \tag{24}$$

Then the mean error in SNR and the estimated parameters are bounded.

$$\sigma\|\psi_i(l)\|^2 < 1 \tag{25}$$

$$0 < \Gamma < 1 \tag{26}$$

$$k_{vmax} < 1/\sqrt{\delta} \tag{27}$$

where $$\delta = \eta + 1/(1-\sigma\|\Psi_i(l)\|^2)[\Gamma^2(1-\sigma\|\Psi_i(l)\|^2)^2 + 2\sigma\Gamma\|\Psi_i(l)\|^2 (1-\sigma\|\Psi_i(l)\|^2)] \tag{28}$$

and $\sigma$ is the adaptation gain.

Note: The parameters $\sigma$, $\eta$, $\delta$ are dependent upon the desired SNR value with time.

Selecting a Lyapunov function candidate $$J_i = e_i^T(l)e_i(l) + \frac{1}{\sigma}\kappa[\tilde{\theta}_i^T(l)\tilde{\theta}_i(l)] \tag{29}$$

Use the channel estimation error equation (23) and parameter tuning mechanism to obtain $$\Delta J \leq -[1 - \sigma k_{vmax}^2]\|e_i(l)\|^2 - [1 - \sigma \Psi_i^T(l)\Psi_i(l)] \cdot \tag{30}$$
$$\left\|\tilde{\theta}_i^T(l)\Psi_i(l) - \frac{1}{(1-\sigma\Psi_i^T(l)\Psi_i(l))}(\sigma\Psi_i^T(l)\Psi_i(l) + 2\Gamma\|I - \sigma\Psi_i(l)\Psi_i^T(l)\|) \cdot (k_v e_i(l) + \varepsilon(l) + d(l))\right\|^2 +$$
$$2\gamma k_{vmax}\|e_i(l)\| + \rho - \frac{1}{\sigma}\|I - \sigma\Psi_i(l)\Psi_i^T(l)\|^2[\Gamma(2-\Gamma)\|\tilde{\theta}_i(k)\|\theta_{max} - \Gamma^2\theta_{max}^2]$$

where $$\gamma = [\eta(\epsilon_N + d_M) + \Gamma(1-\sigma\|\psi_1(l)\|^2)\|\Psi_i(l)\|\theta_{max}] \tag{31}$$

and $$\rho = [\eta(\epsilon_N + d_M)^2 + 2\Gamma(1-\sigma\|\Psi_i(l)\|^2)\|\Psi_i(l)\|\theta_{max}(\epsilon_N + d_M)] \tag{32}$$

Completing the squares for $\tilde{\theta}_i(l)$ in equation (30) and taking expectations on both sides results in $E(J)>0$ and $E(\Delta J)\leq 0$, this shows the stability in the mean via sense of Lyapunov provided the conditions (25) and (27) hold. This demonstrates that $E(\Delta J)$ is negative outside a compact set U. According to a standard Lyapunov extension, the SIR error $E[e_i(l)]$ is bounded for all $l \geq 0$ and the upper bound on the mean SIR error is given by $$E(\|e_i(l)\|) > 1/(1-\sigma k_{vmax}^2)\left[\gamma k_{vmax} + \sqrt{\rho_1(l-\sigma k_{vmax}^2)}\right] \tag{33}$$

where $$\rho_1 = \rho + \frac{1}{\sigma}\frac{\Gamma}{2-\Gamma}(1-\sigma\|\theta(l)\|^2)^2\theta_{max}^2 \tag{34}$$

On the other hand, completing the squares for $\|e_i(l)\|$ in (30) results in $E(\Delta J)\leq 0$ as long as the conditions in equation (25) and in equation (27) are satisfied and $$E(\|\tilde{\theta}_i(l)\|) > \tag{35}$$
$$\left(\Gamma(1-\Gamma)\theta_{max} + \sqrt{\Gamma^2(1-\Gamma)^2\theta_{max}^2 + \Gamma(2-\Gamma)\Theta}\right)/(\Gamma(2-\Gamma))$$

where $$\Theta = [\Gamma^2\theta_{max}^2 + \sigma\rho_1/(1-\sigma\|\Psi_1(l)\|^2)^2] \tag{36}$$

and $$\rho_1 = \rho + \frac{\gamma^2 k_{vmax}^2}{(1-\delta k_{vmax}^2)} \tag{37}$$

In general $E(\Delta J)\leq 0$ in a compact set as long as conditions (25) and (27) are satisfied and either equations (33) or (34) holds. Using the standard Lyapunov extension theorem it can be demonstrated that the tracking error and the error in weight estimates are bounded without the need for any PE condition on the inputs.

In a dense reader environment, it is inconceivable that all readers will be able to achieve their target SNR together due to severe congestion, which affects both read rates and coverage. These readers will eventually reach maximum power as a result of the adaptive power update. As a result, a time-based yielding strategy of some readers is required to allow others readers to achieve their target SNR.

Whenever a particular reader finds the target SNR is not achievable at maximum power, the interference level is too high in the reader network, and that particular reader should back-off to a low output power for some period of time. Since interference is a locally experienced phenomenon, multiple readers face this situation and will all be forced to back-off. The rapid reduction of power will result in significant improvement of SNR at other readers. After waiting for the back-off period, a reader will return to normal operation and attempt to achieve the target SNR. The selective back-off process is repeated for every reader in the network. However, to fairly distribute the channel access among all congested readers, certain quality measurements must be ensured for all readers in the back off scheme. For example, the selective back-off scheme may use the percentage of time a reader has achieved desired range as the quality control parameter to ensure the fairness. According to one aspect of the RFID system 100, after backing off, each reader waits for a time duration $T_w$ before returning to a normal mode of operation.

To illustrate the effect of back off process, $T_w$ is defined as a logarithm function of the percentage of time $\rho$ a reader has attained the required SNR. A neglected reader will exit back-off mode quickly and attain the required SNR while other readers in the vicinity fall back. The calculation of $T_w$ is given by $$\tau_w = 10 \cdot [\log_{10}(\rho + 0.01) + 2] \tag{38a}$$

Figure 3C:
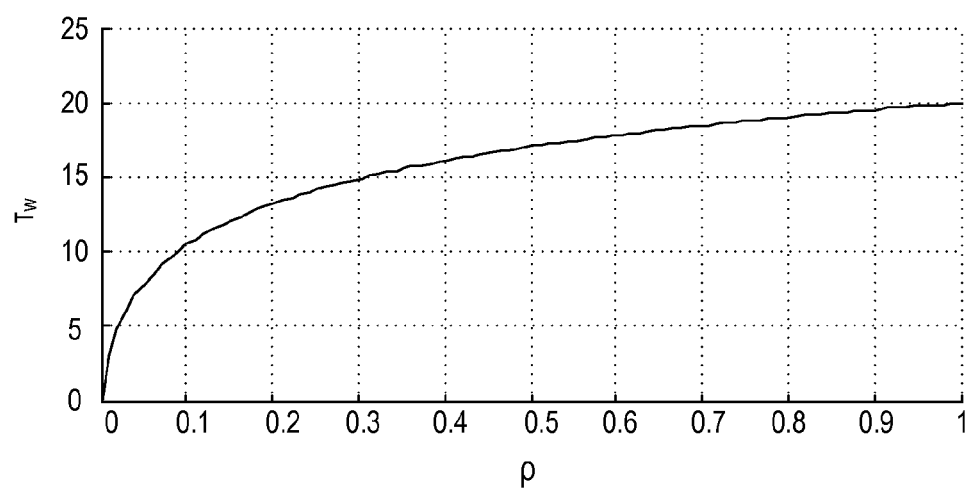
FIG. 3C is a plot of waiting time vs. percentage of time a reader has attained a required SNR.

Using the above equation, a reader with $\rho$ equals 10% will wait for 10 time intervals while the waiting time for $\rho$ of 100% equals 20. A plot of waiting time $T_w$ versus $\rho$ is presented in FIG. 3C.

Referring back to FIG. 3A, it can be seen that the component architecture of the first and second readers 110, 114 may be substantially the same. The first reader 110 includes a microprocessor operatively associated with a transmitter 302 and a receiver 306. The transmitter 302 and receiver 306 are operatively coupled to an antenna 308 for sending the first carrier signal 120 and receiving the backscatter signal 124, respectively. Notably, it is contemplated that the transmitter 302 and receiver 306 may be integrated in the form of a transceiver. The first reader 110 may also include a memory 309 for storing data that can be retrieved by the microprocessor 304.

The second reader 114 includes a microprocessor 312 operatively associated with a transmitter 310 and a receiver 314. The transmitter 310 and receiver 314 may be operatively coupled to an antenna 316. Again, it is contemplated that the transmitter 310 and receiver 314 may be integrated in the form of a transceiver. The transmitter 310 transmits the second carrier signal 122 via the antenna 316 and the receiver 314 receives a backscatter signal 124 via the antenna 316. Transmitters 302, 310 may be operatively coupled to or incorporate modulation and encoding circuitry (not shown) for the purpose of generating and encoding carrier signals, 120,124, respectively, for broadcast by the antennas 308, 316, respectively. Receivers 306, 314 may be operatively coupled to or incorporate demodulation and decoding circuitry (not shown) for the purpose of extracting tag information from a received backscatter signal 124. The second reader 114 may also include a memory 317 for storing data that can be retrieved by the microprocessor 312.

The tag 118 may include a receiver 318 and a transmitter 320 that are operatively coupled to an antenna 322. The receiver 318 provides a carrier signal (e.g., first or second carrier signals, 120,122) received via the antenna 322 to power a harvesting circuit 324. The power harvesting circuit 324 can convert low-voltage oscillating RF energy contained in a carrier signal (e.g., first or second carrier signals 120,122) into a higher voltage direct current (DC) signal, which can be used to power a microprocessor 326. The microprocessor 326 interprets commands contained in the carrier signals received from the first or second readers 110,114, and retrieves stored data such as item data from a memory component 328 (e.g. an EEPROM) for transmission back to the first or second readers 110,114. The transmitter 320 may be operatively coupled to or incorporate modulation and encoding circuitry (not shown) for the purpose of generating and encoding the backscatter signal 124 for broadcast by the antenna 326, while the receiver 318 may be operatively coupled to or incorporate demodulation and decoding circuitry for the purpose of extracting information from a received carrier signal (e.g., carrier signal 120,122). For purposes of illustration, the backscatter signal 124 is described herein as being created in response to the first carrier signal 120 and the backscatter signal 124 is received by the receiver 306 of the first reader 110 via the antenna 308 and transferred to the microprocessor 304. As such, the interference is will be based on the second carrier signal 122 being detected by the first reader 110.

The microprocessor 304 may employ a power control scheme to adjust the transmission power level of the first reader 110 and achieve a desired read range and read rate. As described above, in connection with FIG. 2, it is possible for the first reader 110 to be located within the frequency interference range of the second reader 114. As a result, it is possible that the second carrier signal 122 can create frequency interference at the first reader 110. According to an aspect of the decentralized RFID system 100, the microprocessor 304 is responsive to the received backscatter signal 124 to implement distributed adaptive power control for the first reader 110. More specifically, the microprocessor 304 is responsive to the received backscatter signal 124 to determine an interference level between the carrier signal 122 and the backscatter signal 124 at the first reader 110 and to adjust the transmission power level of the first carrier signal 120 as a function of the determined interference level.

Figure 4:
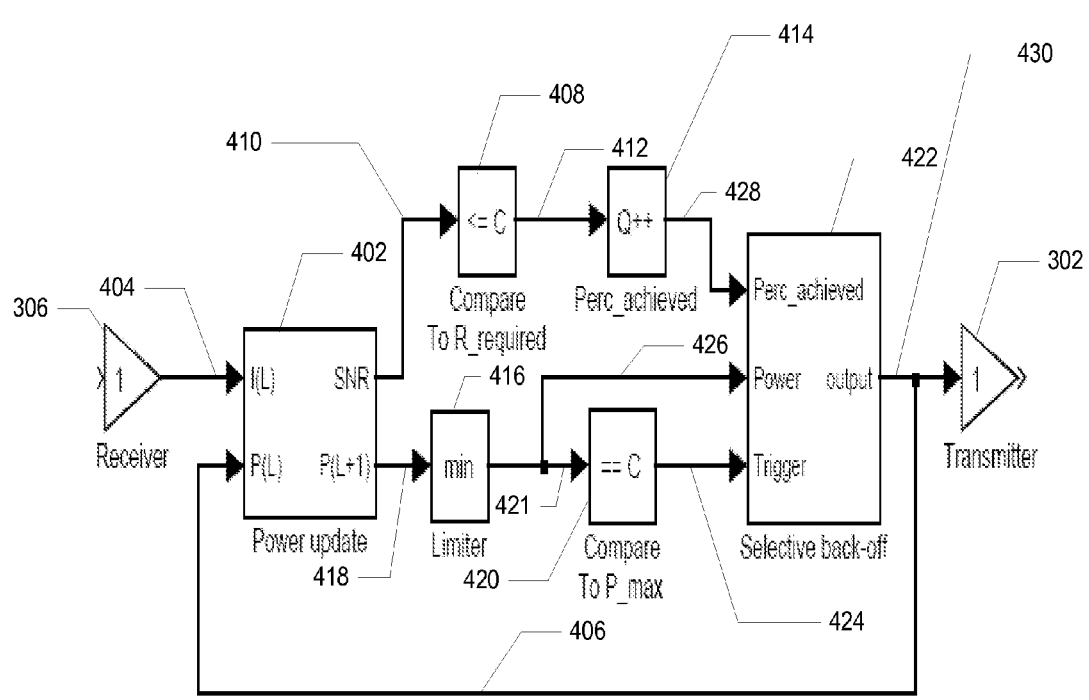
FIG. 4 is a block diagram illustrating embedded components of a microprocessor for implementing the decentralized RFID system.

FIG. 4 illustrates the components of a microprocessor 304 for implementing distributed adaptive power control. A power update component 402 is operatively linked to the input of the transmitter 302 and receives the current transmission power $P_1$ being provided to the transmitter 302, as indicated by reference character 404. The power update component 402 calculates a current SNR value based on the defined desired read range, $r_d$, the required SNR, $R_{required}$, and the received current transmission power $P_1$ of the first reader 110. For example, the current SNR value, $R_{current}$, can be calculated using the following equation:

$$R_{current} = \frac{P_1 * g_{ii}}{I_L} \quad (38b)$$

where $P_1$ is the current trans power, $g_{ii}$ is the 2-way attenuation (gain) for distance $r_d$, and $I_L$ is the measured interference level. The 2-way attenuation corresponds to the total antenna+propagation path gain from reader to tag and back to reader, and is based only on the antenna properties and the distance which is known. The 2-way attenuation $g_{ii}$ is specified in equation (3), and the desired range, $r_d$, and required SNR value are predefined and are retrieved from a memory (e.g., see memory 309) linked to the microprocessor 304.

The power update component 402 further receives the output from the receiver 306, as indicated by reference character 406, and senses the interference, $I_1$, caused by a carrier signal 122 from the second reader 114 being received by the receiver 306 and updates the power. In particular, the power update component 402 senses the interference from the second reader 114 as a function of the difference between the calculated current SNR (e.g., equation 2) of the backscatter signal 124 received by the receiver 306 and an expected SNR required to achieve a desired read and bit error rate. The difference between the calculated current SNR and the required SNR corresponds to the amount of interference received from the second reader 114. A SNR comparator component 408 receives the calculated current SNR from the power update component 402, as indicated by reference character 410, and compares the calculated current SNR to the required SNR retrieved from the memory 309 of the first reader 110. If the calculated current SNR is less than the required SNR value, the SNR comparator component 408 generates an output signal, as indicated by reference character 412 having a first magnitude (e.g., 0 volts). If the calculated current SNR is equal to the required SNR, the SNR comparator component 408 generates an output signal 412 having a second magnitude (e.g., 5 volts).

A percentage SNR achieved component 414 receives the output signal 412 from the SNR comparator component 408 and calculates a back-off parameter, ρ, which corresponds to a percentage of time the required SNR is achieved. As described above, the back-off parameter, ρ, is used when implementing the back-off scheme to ensure equal channel access between readers 110,114. The back-off parameter ρ is the percentage of time that the reader has achieved the required read range. In other words, a count is kept of all the time slots during which the read range is achieved and of the time slots during which the read range is not achieved. Based on this data, the back-off parameter ρ can be calculated by dividing the number of times the required read range $R_d$ is achieved by the total number of time slots (e.g., times Rd is achieved plus times Rd is not achieved).

The power update component 402 can further estimate channel behavior at a next time step (e.g., see equation 24) and can calculate a new transmission power, $P_{i+1}$, required to achieve the desired SNR at the next time step as a function of the channel estimate using (e.g., see equations 21 and 24).

A limiter component 416 receives the calculated new transmission power, $P_{i+1}$, required to achieve the required SNR from the power update component 402 as indicated by reference character 418. The limiter component 416 is responsive to the calculated transmission power for the next time step to limit the actual transmission power to within specified maximum and minimum values if necessary, Such specified maximum and minimum values may be governed by spectral regulations.

A power comparator component 420 receives the calculated power $P_{i+1}$ from the limiter component 416, as indicated by reference character 421, and compares the calculated power $P_{i+1}$ to a maximum transmission power value retrieved from the memory 309 of the first reader 110. If the calculated power $P_{i+1}$ is less than the maximum transmission power value, the power comparator component 420 generates a low output signal (e.g., 0 volts). If the calculated power $P_{i+1}$ is greater than the maximum transmission power value, the power comparator component 420 generates a high output signal (e.g., 5 volts).

A selective back-off component 422 receives the output signal from the power comparator component 420 at a trigger input as indicated by 424, receives the calculated new power $P_{i+1}$ from the limiter 416 at a power input as indicated by 426, and the receives the back-off parameter, $\rho$, from the percentage SNR achieved component 414 at percentage input, as indicated by 428.

Using the inputs 424, 426, and 428 the selective back-off component 422 insures that the transmission power output to the transmitter 302, as indicated by 430, is not adjusted above the maximum power level stored in the memory 309 of the first reader 110. In particular, if the trigger input 424 indicates that the calculated power $P_{i+1}$ is less than maximum transmission power value, the selective back-off component 422 operates the first reader 110 in normal mode and outputs the new calculated power $P_{i+1}$ to the transmitter 302 for generating the carrier signal 120. Alternatively, if the trigger input 424 indicates that the calculated power $P_{i+1}$ is greater than maximum transmission power value, the selective back-off component 422 operates the first reader 110 in back-off mode, and uses the stored back-off parameter p to calculate a period of time $t_w$ (e.g., equation 38a) the first reader 110 must wait before returning to normal operation and attempt to achieve the target or required SNR value.

Figure 5:
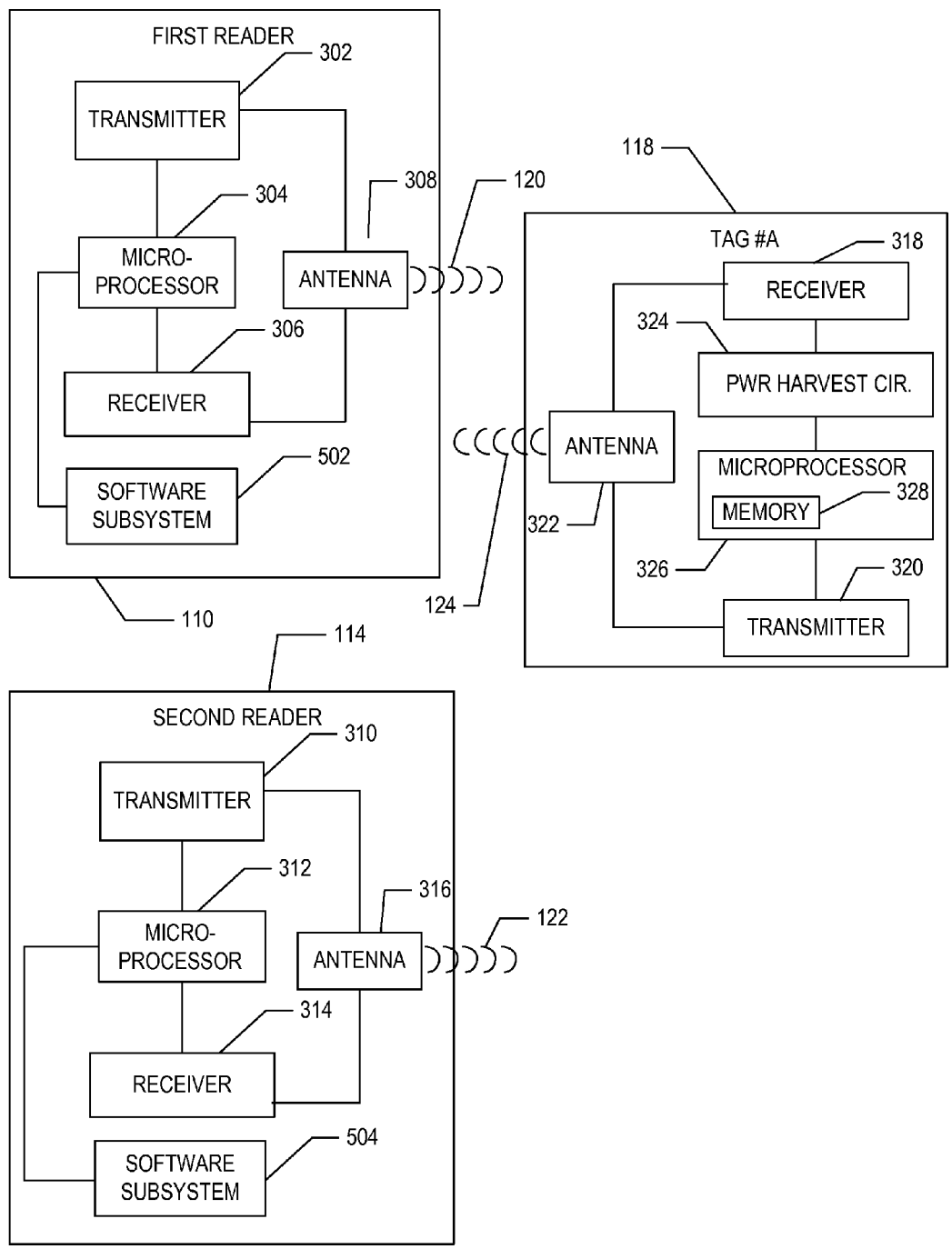
FIG. 5 is a block diagram illustrating operational components of another aspect of the decentralized RFID system.

Referring to FIG. 5, a block diagram illustrates readers 110, 114 operatively associated with modules 502, 504, respectively, for implementing the decentralized RFID system 100. The modules 502, 504 are, for example, software subsystems. As shown, the architecture of the tag 118 readers 110, 114 can be substantially the same as described above in reference to FIG. 3A. However, according to this aspect of the decentralized RFID system 100, rather than a microprocessor 304 being configured with components for implementing distributed adaptive power control, the microprocessor 304 is operatively associated with a module 502 which executes instructions or code to implement distributed adaptive power control. Although the software system 502 is illustrated as being separate from the microprocessor 304, it is contemplated that the microprocessor 304 may include an application layer having instructions or code for implementing the distributed adaptive power control.

Figure 6:
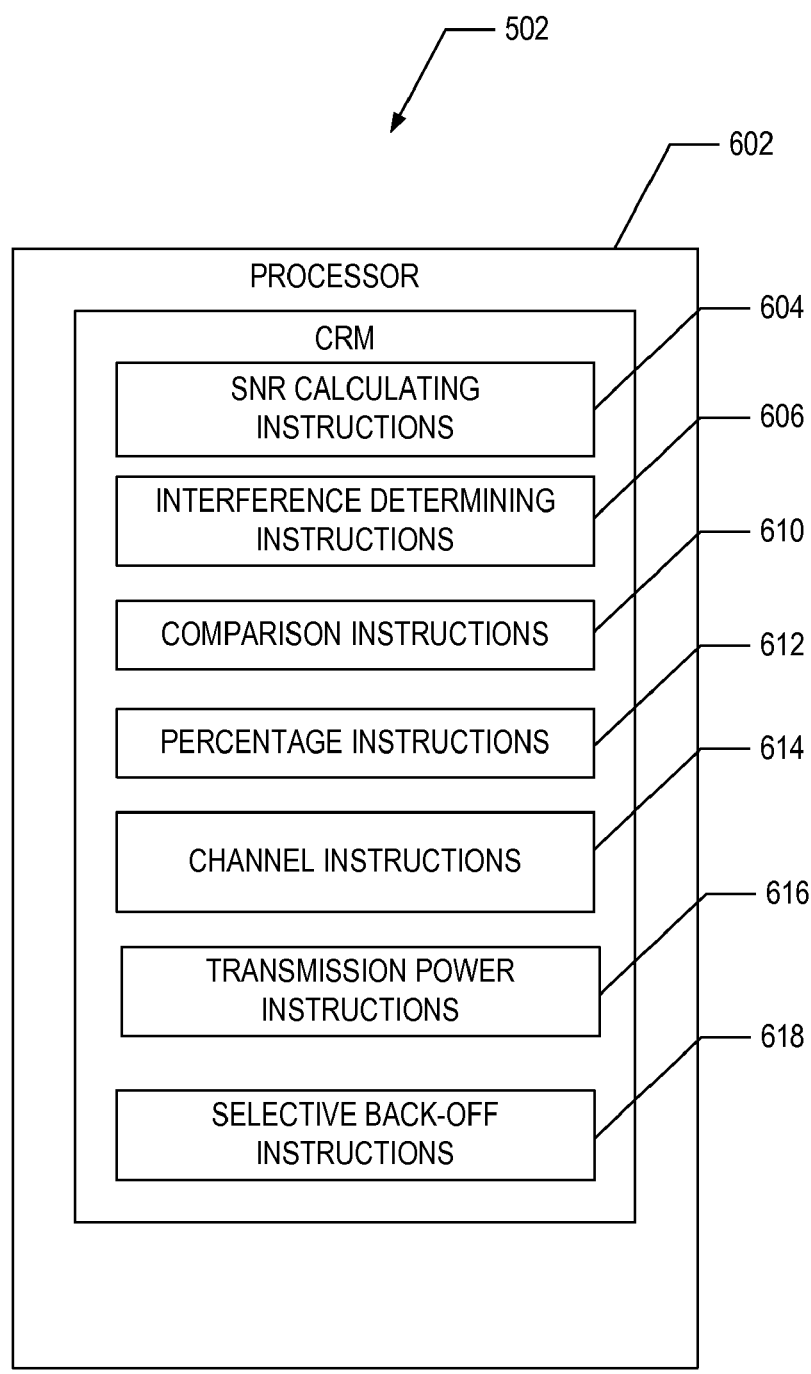
FIG. 6 is a block diagram illustrating components of a module for implementing the decentralized RFID system.

FIG. 6 illustrates the components of one embodiment of the module 502 for implementing distributed adaptive power control. Notably, components of the module 504 can be identical to the components of the module 502. The module 502 may include a processor 602 having a computer readable medium 604 that includes executable instructions for implementing distributed adaptive power control.

SNR calculating instructions 604 calculate a current SNR value based on the defined desired read range, $r_d$, the required SNR, $R_{required}$, and the received current transmission power $P_1$ of the first reader 110 (e.g., see equation 38b). The desired range, rd and required SNR value are predefined and are retrieved from a memory 309 of the first reader 110.

Interference determining instructions 606 determine the interference, $l_i$, as a function of the difference between the calculated current SNR (e.g., see equation 2) of the backscatter signal 124 received by the receiver 306 and the SNR required to achieve a desired read and a bit error rate. The difference between the calculated current SNR and the required SNR corresponds to the amount of interference received from the second reader 114.

Comparison instructions 610 compare the calculated current SNR value to the required SNR value retrieved from the memory 309 of the first reader 110 and defines a SNR parameter as a function of the comparison. For example, if the calculated current SNR is less than the required SNR value, the SNR parameter has a first value (e.g., 0). If the calculated current SNR is equal to the required SNR, the SNR parameter has a second value (e.g., 1).

Percentage instructions 612 calculate a back-off parameter, $\rho$, as a function of the SNR parameter. As described above, the back-off parameter, $\rho$, corresponds to a percentage of time the required SNR is achieved. Channel instructions 614 calculate a frequency channel at a next time step based on equation (24) and transmission power instructions 616 calculate a new transmission power, $P_{i+1}$, required to achieve the desired SNR at the next time step as a function of the channel estimate using the feedback control equation (21).

Selective back-off instructions 616 determine whether the microprocessor will operate in a normal mode or a back-off mode. For example, if the new calculated transmission power, $P_{i+1}$, is less than the maximum transmission power value, $P_{max}$, the selective back-off instructions 618 operate the microprocessor 304 in normal mode. During normal mode, the selective back-off instructions 616 transfer the new calculated transmission power, $P_{i+1}$, to the microprocessor 304 for operating the transmitter 306. Alternatively, if the new calculated power $P_{i+1}$ is greater than the maximum transmission power value, $P_{max}$, the selective back-off instructions 616 operate the microprocessor 304 in back-off mode. During back-off mode, selective back-off instructions 618 use an equation such as equation (38a) to calculate a period of time $t_w$ the first reader 110 must wait before returning to normal operation at the maximum transmission power value, $P_{max}$.

Referring now to FIG. 7, a method for implementing distributed adaptive power control (DAPC) is illustrated. The DAPC process is initiated at step 702. At step 704, the level of frequency interference between the first reader 110 and the second reader 114 is sensed, and an expected SNR value is calculated for achieving a desired read range. The microprocessor 304 determines whether the predicted SNR is sufficient for reading the tag at decision point 706. If the microprocessor 304 determines that the tag is unreadable at decision point 706, the value of a need variable is retrieved from memory, incremented, and the incremented value is stored in the memory at step 708. The need variable is equal to 100%−$\rho$, and, thus corresponds to the percentage of time a reader has not achieved required read range. If the microprocessor 304 determines that the tag is readable at decision point 706, the reader 110 is set to operate in normal mode, and the value of the need variable is set to zero and stored in memory at step 710. The microprocessor 304 determines if the reader is in back-off mode at decision point 712. In particular, the microprocessor 304 can check the value of the need variable stored in memory to determine whether the reader 110 is in a normal operation mode or a selective back-off mode. If the value of the need variable is equal to the reset value (e.g., 0), then the reader 110 is in normal mode. Alternatively, if the value of the need variable is greater than the reset value (e.g., 1 or >1) then the reader 110 is in back-off mode.

If the reader 110 is not determined to be in back-off mode at decision point 712, then the microprocessor 304 sets a new transmission power level based on a calculated power adjusted with channel estimation at step 713 (e.g., see equation 24). At decision step 714, the microprocessor 304 determines if the calculated power is greater than a maximum power level stored in the memory 309 of the microprocessor 304. If the microprocessor 304 determines that calculated power is not greater than the stored maximum power level, the microprocessor 304 determines whether the calculated power is less than a minimum power level stored in the memory 309 of the microprocessor 304 at decision point 716. If the microprocessor 304 determines the calculated power is less than the stored minimum power level, the microprocessor 304 sets the actual power level equal to the minimum power level at step 718. Thereafter, the microprocessor 304 returns to step 702. If the microprocessor 304 determines the calculated power is not less than the stored minimum power level, the microprocessor 304 returns to step 702.

If the microprocessor 304 determines that the calculated power is greater than the stored maximum power level at decision point 714, the microprocessor 304 sets the operation mode of reader 110 to random back-off-mode and sets a back-off timer parameter equal to a random value plus the value of the stored need variable at step 720. At step 722, the microprocessor 304 decrements the back-off timer parameter. Also, if the reader 110 is determined to be in back-off mode at decision point 712, then the microprocessor 304 decrements the back-off timer parameter at 722. At decision point 724, the microprocessor 304 determines if the value of the back-off timer is equal to zero. If the back-off timer is equal to zero, the microprocessor 304 sets the current power equal to the stored minimum power level and sets the operation mode of reader 110 to normal at step 728. Thereafter, the microprocessor 304 returns to step 702. Alternatively, if the back-off timer is not equal to zero, the microprocessor 304 sets the current power equal to the stored maximum power level at step 726. Thereafter, the microprocessor returns to step 702.

According to another aspect of the decentralized RFID system 100, the microprocessor 304 is responsive to the received backscatter signal 124 to implement probabilistic power control of the first reader 110.

The idea of probabilistic power control comes from simple TDM algorithms. If a reader is assigned a time slot to transmit in full power while others are turned off, it will achieve maximum range. A round robin assignment of time slots can assure that all readers operate with no interference. However, this is inefficient in terms of average read range, reader utilization, and waiting periods. It is obvious that more than one reader can operate in the same time slot but at different power levels to accomplish better overall read range. If the power levels at all readers change in each time slot following certain distribution, over time, every reader will be able to achieve its peak range while maintaining a good average.

For a distributed solution, this would involve setting a probability distribution for power to be selected for each time step. Such a distribution would need to be adapted based on the density and other parameters of the reader network.

Equation (9) states that the read range of a particular reader is dependent on its transmission power and the interference experienced which is a function of the transmission powers of all other readers. If the powers of all the other readers follow a certain probability distribution, the distribution of read ranges for each reader is a function of these power distributions $$F(r_i) = f_i(F(P_1), \ldots, F(P_n)) \tag{39}$$

where $F(r_i)$ is the cumulative density function of read range of reader i, and $F(P_j)$ is the cumulative power density function of reader i. Performance metrics including mean read range $\mu$, and percentage of time $\rho$ achieving desired range $r_d$ characterized the read range distribution $F(r_i)$.

$$F(r_i) = g_i(\mu, \rho) \tag{40}$$

Figure 8A:
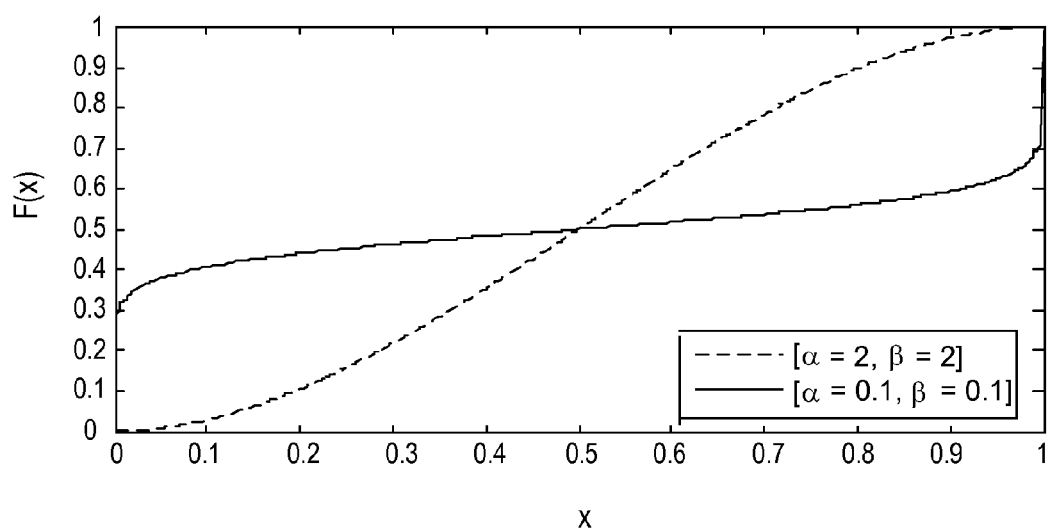
FIG. 8A is a plot of a Beta distribution.

Beta distribution, demonstrated in FIG. 8A, is selected so that the power distribution can be modified freely by specifying the shape variables $\alpha$ and $\beta$, the cumulative density function can be changed in the domain from 0 to 1 (0% to 100% power). By changing these two parameters, the power distribution can be controlled, and desired targets on the read range distribution in equation (39) can be achieved. Power using Beta distribution can be represented as $$F(P_i) = H(P_i; \alpha, \beta) \tag{41}$$

Figure 8B:
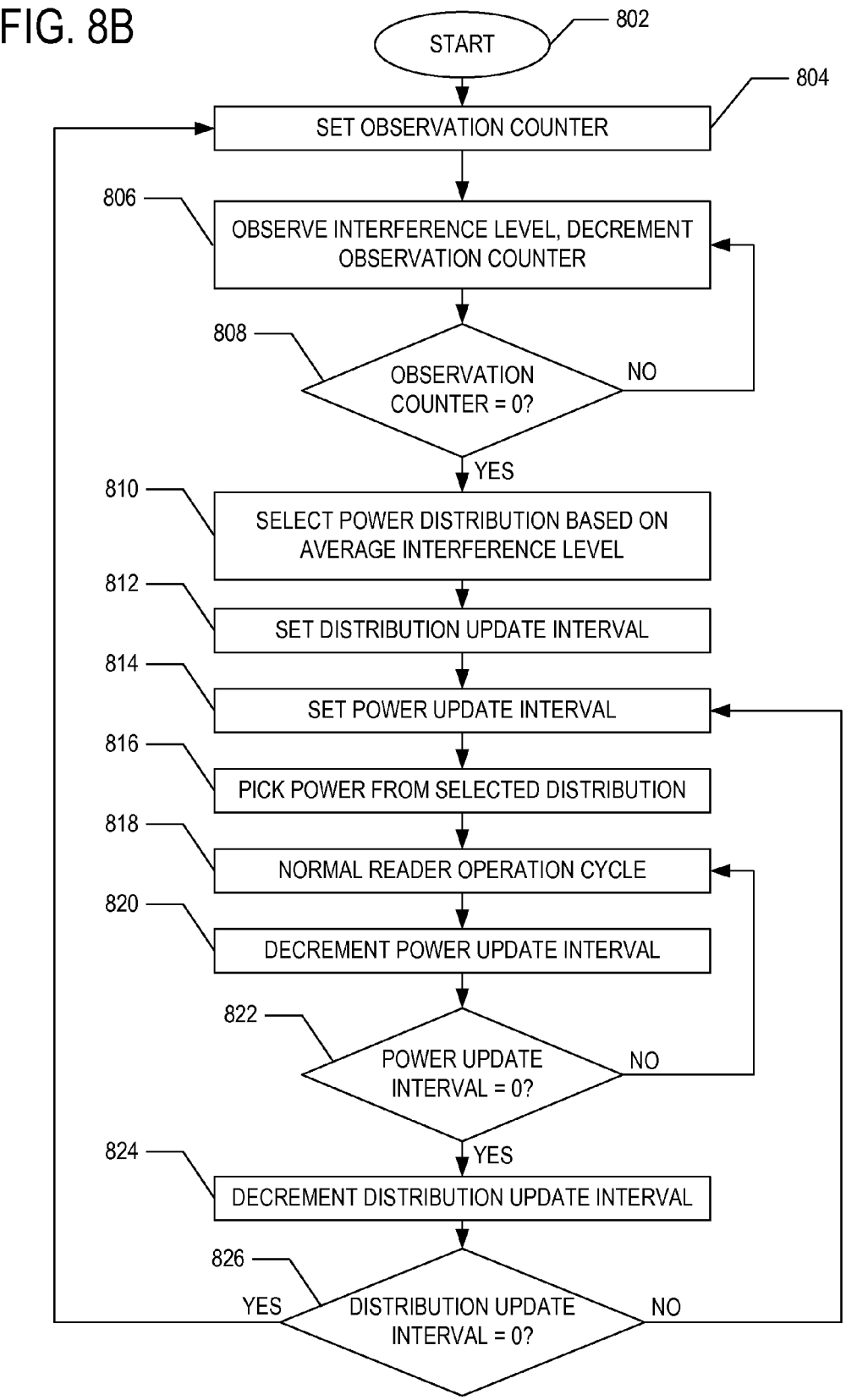
FIG. 8B is a flow chart illustrating a method for implementing probabilistic power control (PPC) of the decentralized RFID tracking system.

In FIG. 8B, a method for implementing probabilistic power control is illustrated. The PPC process is initiated at step 802. At step 804, an observation counter parameter value is set The power update interval defines how often (or after how many time steps) the power value is changed. The observation counter defines how many time steps the radio environment is observed to assess interference levels based on which a distribution is selected. As known to those skilled in the art, each of the power update interval and observation counter depend on the reader application and the dynamics of the scenario. The microprocessor 304 then observes the amount of interference such as described above in reference to FIG. 4 and decrements the observation value by one unit at step 806. At decision point 808, the microprocessor 304 determines whether the observation parameter is equal to zero. If the value of the observation parameter is not equal to zero at decision point 808, then the process returns to step 806. If the value of the observation parameter is equal to zero at decision step 808, then the microprocessor 304 selects a power distribution based on an average interference level (e.g., see beta distribution in FIG. 8A) at step 810. At step 812, the microprocessor 304 sets the distribution update interval. The distribution update interval defines how often the interference value is assessed and how often a new distribution selected for power updates. The microprocessor 304 then sets a power update interval parameter to define how often the power value is updated at step 814. At step 816, the microprocessor 304 selects a power from the selected distribution based on the sensed interference. The microprocessor 304 operates the first reader in normal mode at the selected power at step 818. At step 820, the microprocessor 304 decrements the power update interval.

At decision point 822, the microprocessor 304 determines whether the power update interval is equal to zero. If the value of the power update interval is not equal to zero, then the process returns to step 818. If the value of the power update interval is equal to zero at decision step 808, then the microprocessor 304 decrements the distribution update interval at step 824. At decision point 826, the microprocessor 304 determines whether the distribution update interval is equal to zero. If the value of the distribution update interval is not equal to zero at decision point 826, then the process returns to step 814. If the value of the distribution update interval is equal to zero at decision point 826, then the process returns to step 804.

In operation, a computer readable medium (e.g., CRM 604) executes computer-executable instructions such as those illustrated in the FIGS. 7 and 8B to implement the RFID system 100.

The order of execution or performance of the operations in embodiments of the RFID system 100 illustrated and described herein is not essential, unless otherwise specified. That is, the operations may be performed in any order, unless otherwise specified, and embodiments of the RFID system 100 may include additional or fewer operations than those disclosed herein. For example, it is contemplated that executing or performing a particular operation before, contemporaneously with, or after another operation is within the scope of embodiments of the RFID system 100.

Embodiments of the RFID system 100 may be implemented with computer-executable instructions. The computer-executable instructions may be organized into one or more computer-executable components or modules. Aspects of the invention may be implemented with any number and organization of such components or modules. For example, aspects of the RFID system 100 are not limited to the specific computer-executable instructions or the specific components or modules illustrated in the figures and described herein. Other embodiments of the RFID system 100 may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A decentralized RFID system comprising:
   a first reader for transmitting a first carrier signal;
   a second reader for transmitting a second carrier signal;
   a tag for receiving the first and second carrier signals, wherein the tag is responsive to the first carrier signal to transmit a first backscatter signal, and wherein the tag is responsive to the second carrier signal to transmit a second backscatter signal; and
   wherein the first and second readers further include a first processor and a second processors, respectively, and wherein the first processor measures a degree of interference from the second carrier signal, and wherein the second processor measures a degree of interference from the first carrier signal, the first and second processor each executing instructions to:
      adjust a respective transmission power level of the first and second carrier signals being transmitted from the first and second readers, respectively, as a function of the measured degree of interference;
      calculate a new transmission power level of the corresponding first and second readers based on the degree of interference measured at the first and second readers and an estimated channel behavior at a next time step, wherein the new transmission power level is controlled such that an expected signal-to-noise ratio reaches a signal-to-noise ratio required for a desired reading range for the first and second readers,
   wherein a selective back-off scheme is employed by each of the first and second readers to ensure that both the first and second readers achieve a respective desired read range, the selective back-off scheme:
      determining on a percentage of time the first and second readers achieve a respective desired read range based on time a respective first or second reader has attained the required signal-to-noise ratio;
      executing an algorithm that uses a logarithm function of the percentage of time to determine an amount of time for each of the first and second readers to wait before return to the respective transmission power levels, the algorithm comprising:

$$\tau_w = 10 \cdot [\log_{10}(\rho + 0.01) + 2]$$

wherein $\rho$ is the percentage of time a respective first and second reader has attained the required signal-to-noise ratio and $\tau_W$ is the amount of time a respective first and second readers to wait before return to the respective transmission power levels.

2. The decentralized RFID system of claim 1, wherein the new transmission power level is controlled such that an expected signal-to-noise ratio reaches a signal-to-noise ratio required for a desired reading range for the first and second readers.

3. The decentralized RFID system of claim 2, wherein if the expected signal-to-noise ratio is above the required signal-to-noise ratio required for a desired reading range, the transmission power of one of the first or second readers is reduced.

4. The decentralized RFID system of claim 2, wherein if the expected signal-to-noise ratio is below the required signal-to-noise ratio required for a desired read range, the transmission power of one of the first or second readers is increased.

5. The decentralized RFID system of claim 1, wherein the new power transmission for the first and second readers is calculated based on an embedded channel prediction to account for the time-varying facing channel state for a next cycle.

6. The decentralized RFID system of claim 1, wherein the first and second processors execute instructions to select a new transmission power level of the corresponding first and second readers from a specified probability distribution based on the degree of interference measured at the respective first and second readers.

7. A processor having executable components for adjusting a transmission power level of at least one radio frequency identification (RFID) reader in a decentralized RFID system, the decentralized RFID system comprising a first reader to transmit a first carrier signal at a first power level; a second reader to transmit a second carrier signal at a second power level, and a tag to receive the first and second carrier signals and to generate, at the tag, a first backscatter signal in response to the first carrier signal and a second backscatter in response to the second carrier signal, the processor comprising:
   a power update component to determine a current transmission power corresponding to the first carrier signal and to calculate a current signal-to-noise ratio value based on the current transmission power level and signal-to-noise ratio data retrieved from a memory;
   a signal-to-noise ratio comparator component to compare the current signal-to-noise value to a required signal-tonoise value retrieved from the memory and to generate a first output signal as a function of the comparison;

a percentage signal-to-noise ratio achieved component to calculate a back-off parameter as a function of the first output signal, wherein the back-off parameter corresponds to a percentage of time the required signal-to-noise ratio is achieved;

wherein the power update component is further responsive to the first generated output signal to calculate a new transmission power required to achieve the desired signal-to-noise ratio;

a limiter component to receive the new transmission power and to limit the new calculated transmission power within a specified transmission power range;

a power comparator component to receive the new transmission power thru the limiter component, to compare the new transmission power to a maximum transmission power value retrieved from the memory, and to generate a second output signal as a function of the comparison; and a selective back-off component is responsive to the second output signal from the power comparator component, the new transmission power received thru the limiter, and the back-off parameter from the percentage signal-to-noise ratio achieved component to determine whether to operate the first reader in a normal mode or a selective back-off mode, wherein the first reader outputs the new transmission power for generating the first carrier signal during normal mode, and wherein the first reader waits for a determined time period before outputting the new transmission power during the back-off mode.

8. The processor of claim 7, wherein the selective back-off component determines that the first reader is in normal mode when the calculated new power is less than the maximum transmission power, and wherein the selective back-off component determines that the first reader is in the selective back-off mode when the calculated new power is greater than maximum transmission power value.

9. The processor of claim 7, wherein the second generated output signal has a low output signal when the new transmission power is less than the maximum transmission power, and wherein the second generated has a high output signal when the new transmission power greater than the maximum transmission power.

10. The processor of claim 7, wherein the power update component further estimates a channel signal-to-noise ratio value at a next time step and calculates the new transmission power level as a function of the channel estimate.

11. The processor of claim 10 wherein the power update component executes an algorithm to estimate the channel signal-to-noise ratio value, wherein algorithm comprises:

$$\tau_w = 10 \cdot [\log_{10}(\rho+0.01)+2]$$

wherein $\rho$ is the percentage of time a respective first and second reader has attained the required signal-to-noise ratio.

12. The processor of claim 7, wherein the signal-to-noise comparator component generates the first output signal having a first magnitude when the current signal-to-noise value is less than a required signal-to-noise value, and wherein the signal-to-noise ratio comparator component generates the first output signal having a second magnitude when the calculated current signal-to-noise ratio is equal to the required signal-to-noise ratio.

* * * * *

UNITED STATES PATENT AND TRADEMARK OFFICE
CERTIFICATE OF CORRECTION

PATENT NO.       : 8,143,996 B2
APPLICATION NO.  : 11/970912
DATED            : March 27, 2012
INVENTOR(S)      : Jagannathan Sarangapani et al.

It is certified that error appears in the above-identified patent and that said Letters Patent is hereby corrected as shown below:

Column 19, line 53: "processors, respectively," should read --processor, respectively,--

Column 20, line 8: "determining on a" should read --determining a--

Column 20, line 22: "readers to wait" should read --reader waits--

Column 22, line 9: "generated has" should read --generated output signal has--

Column 22, line 10: "power greater" should read --power is greater--

Column 22, line 18: "wherein algorithm" should read --wherein the algorithm--

Signed and Sealed this
Thirty-first Day of July, 2012

David J. Kappos
*Director of the United States Patent and Trademark Office*